United States Patent
Babasaki et al.

(10) Patent No.: US 10,948,892 B2
(45) Date of Patent: Mar. 16, 2021

(54) SERIAL CASCADE CONNECTOR SYSTEM, CONNECTOR MEMBER INCLUDED IN THE SAME, COMBINATION OF CONNECTOR MEMBER AND RELAY CONNECTOR MEMBER AND SAFETY COMPONENT

(71) Applicant: Keyence Corporation, Osaka (JP)

(72) Inventors: Yu Babasaki, Osaka (JP); Shinya Kameoka, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 88 days.

(21) Appl. No.: 16/352,871

(22) Filed: Mar. 14, 2019

(65) Prior Publication Data
US 2020/0057423 A1 Feb. 20, 2020

(30) Foreign Application Priority Data

Aug. 14, 2018 (JP) .............................. JP2018-152787

(51) Int. Cl.
G05B 19/05 (2006.01)
G05B 19/048 (2006.01)
(Continued)

(52) U.S. Cl.
CPC ......... *G05B 19/054* (2013.01); *G05B 19/048* (2013.01); *G05B 2219/13125* (2013.01); *H01R 27/02* (2013.01); *H01R 31/06* (2013.01)

(58) Field of Classification Search
CPC ............... G05B 19/054; G05B 19/048; G05B 2219/13125; G05B 19/058
(Continued)

(56) References Cited

U.S. PATENT DOCUMENTS 7,411,319 B2 8/2008 Suhara et al.
9,976,700 B2 5/2018 Kawanaka et al.
(Continued)

FOREIGN PATENT DOCUMENTS

JP 2005003133 A 1/2005
JP 2005004557 A 1/2005
(Continued)

OTHER PUBLICATIONS

U.S. Appl. No. 16/270,613, filed Feb. 8, 2019 (72 pages).
U.S. Appl. No. 16/270,612, filed Feb. 8, 2019 (58 pages).

*Primary Examiner* — Michael R. Fin
(74) *Attorney, Agent, or Firm* — Kilyk & Bowersox, PLLC

(57) ABSTRACT

To monitor individual safety components or to supply individual operation instructions to corresponding safety components. A connector includes a component-side terminal group used for connection to a corresponding safety component, a downstream-side terminal group used for connection to the downstream side and an upstream-side terminal group used for connection to the upstream side. The downstream-side terminal group includes a downstream-side main information terminal connected to the component-side main information terminal and a downstream-side other terminal different from the downstream-side main information terminal. The upstream-side terminal group includes an upstream-side information terminal capable of being connected to a downstream-side main information terminal of a connector member on the upstream side.

17 Claims, 11 Drawing Sheets

(51) Int. Cl.
*H01R 27/02* (2006.01)
*H01R 31/06* (2006.01)

(58) Field of Classification Search
USPC .......................................................... 307/326
See application file for complete search history.

(56) References Cited

U.S. PATENT DOCUMENTS

| | | | |
|---|---|---|---|
| 10,174,880 B2 | 1/2019 | Kawanaka et al. | |
| 2012/0187777 A1* | 7/2012 | Fischbach | G05B 19/0428 307/326 |
| 2014/0097679 A1* | 4/2014 | Saumer | H04L 12/40045 307/18 |

FOREIGN PATENT DOCUMENTS

| | | |
|---|---|---|
| JP | 2005025479 A | 1/2005 |
| JP | 2008181798 A | 8/2008 |
| JP | 4212963 B2 | 1/2009 |
| JP | 4212964 B2 | 1/2009 |
| JP | 4212965 B2 | 1/2009 |
| JP | 2017500724 A | 1/2017 |

* cited by examiner

SERIAL CASCADE CONNECTOR SYSTEM, CONNECTOR MEMBER INCLUDED IN THE SAME, COMBINATION OF CONNECTOR MEMBER AND RELAY CONNECTOR MEMBER AND SAFETY COMPONENT

CROSS-REFERENCE TO RELATED APPLICATIONS

The present application claims foreign priority based on Japanese Patent Application No. 2018-152787, filed Aug. 14, 2018, the contents of which is incorporated herein by reference.

BACKGROUND OF THE INVENTION

1. Field of the Invention

The present invention relates to a serial cascade connector system for connecting a plurality of safety components, a connector member included in the same, a combination of the connector member and a relay connector member and a safety component.

2. Description of Related Art

As safety components for protecting workers from hazard sources such as a press machine and a work robot, a multiple optical-axis photoelectric sensor that is called a "light curtain" (JP-A-2008-181798 (Patent Literature 1) and a safety door switch (JP-A-2017-500724 (Patent Literature 2) are known. A plurality of such safety components may be installed with respect to one hazard source. The safety components are typically non-contact type safety components outputting ON/OFF signals by a semiconductor switching device. For example, the safety door switch and the multiple optical-axis photoelectric sensor installed at plural gateways of a safety fence surrounding the hazard source, a mat switch and a laser scanner installed inside the safety fence can be cited. Another example of the safety components, mechanical contact-type safety components can be cited. The contact-type safety components include a contact mechanically opened and closed. For example, an emergency stop switch can be cited as an example. The safety door switch has a contact type and non-contact type. Therefore, the safety door switch can be included in the contact-type safety components.

When all of these plural safety components output an operation permission signal, the hazard source can operate. On the other hand, when at least any one of these safety components does not output the operation permission signal, namely, when any one of safety components outputs an operation non-permission signal, the hazard source stops operating or operates at a non-hazardous speed or based on manual operation by a controller (for example, a PLC) that receives a safety signal from the safety component.

SUMMARY OF THE INVENTION

Plural safety components are generally connected by using a serial cascade connector system. Then, a state detected by an upstream-side safety component is received by a downstream-side safety component. When both of a state detected by the downstream-side safety component and the state detected by the upstream-side safety component are a predetermined safety state, the downstream-side safety component outputs the operation permission signal (an ON signal). The downstream-side safety component does not output the operation permission signal (outputs an operation non-permission signal, namely, an OFF signal) in other cases.

As described above, a series of plural safety components connected in series supplies the safety signal to the controller in a form that states detected by respective safety components are combined by the downstream-side safety component closest to the controller (for example, the PLC).

The serial cascade connector system that connects plural safety components has an advantage of wire saving in which wiring can be simplified. However, there is a disadvantage that, when it is necessary to monitor individual safety components or when it is necessary to instruct operations to individual safety components respectively, it is difficult to respond to them. Accordingly, a method of monitoring respective safety components by performing communication with individual components separately or a method of supplying individual operation instructions to corresponding safety components are adopted.

An object of the present invention is to provide a serial cascade connector system capable of monitoring respective safety components or supplying respective operation instructions to corresponding safety components, a connector member included in the same, a combination of the connector member and a relay connector member and a safety component. That is, an object of the present invention is to allow individual safety components and the controller to give and receive information therebetween by using physical wiring included in the serial cascade connector system, not by communication.

FIGS. 1A and 1B are conceptual diagrams of the invention for explaining the concept of the present invention. In the following explanation, terms "downstream side" and "upstream side" are used, and these terms have relative meaning. The "downstream side" means a side close to the controller (for example, the PLC) and the "upstream side" means a side remote from the controller. In the drawings, a reference sign "CCS" indicates a serial cascade connector system. Though FIGS. 1A and 1B show two safety components 2 as the minimum unit, the present invention can be naturally applied to three or more safety components.

In FIGS. 1A and 1B, wiring for a power supply and wiring for safety signals included in the serial cascade connector system CCS are not shown for avoiding complication of diagrams. The wiring for safety signals is naturally redundant, which is typically formed by wiring in two systems.

Referring to FIGS. 1A and 1B, concerning two connector members 4 included in the serial cascade connector system CCS, a connector member positioned relatively on the downstream side is called a "first connector member", in which (1) is added to a reference numeral 4. A connector member positioned on the upstream-side is called a "second connector member", in which (2) is added to the reference numeral 4. When the first connector member 4 (1) and the second connector member 4 (2) are collectively called, a term "connector member 4" is used.

The first connector member 4 (1) corresponds to a first safety component 2 (1) positioned on the downstream side. The second connector member 4 (2) corresponds to a second safety component 2 (2) positioned on the upstream side. Each connector member 4 includes a component-side terminal group 6 which can be connected to the corresponding safety component, a downstream-side terminal group 12 which can be connected to downstream-side devices such as a PLC 10 and the connector member and an upstream-side terminal group 14 which can be connected to upstream-side connector member 4.

The component-side terminal group 6 has a component-side main information terminal 6 (*a*) inputting or outputting information with respect to the corresponding safety component 2.

The downstream-side terminal group 12 includes at least two downstream-side information terminals 12 (*a*) inputting or outputting information with respect to the controller 10 such as the PLC. The two downstream-side information terminals 12(*a*) include one downstream-side main information terminal 12 (*a*M) and other downstream-side other information terminal 12 (*a*0). A plurality of downstream-side other information terminals 12 (*a*0) are provided in conjunction with the number of the safety components 2.

The upstream-side terminal group 14 includes at least one upstream-side information terminal 14 (*a*). In the shown upstream-side terminal group 14, two upstream-side information terminals 14 (*a*) are shown. In order to discriminating the two upstream-side information terminals 14 (*a*), terms "first" and "second" are used as well as reference signs 14 (*a*-1) and 14 (*a*-2) are added. These first and second upstream-side information terminals 14 (*a*-1) and 14 (*a*-2) are arranged at positions corresponding to the above-described downstream-side main information terminal 12 (*a*M) and the downstream-side other information terminal 12 (*a*0).

In each connector member 4, the component-side main information terminal 6 (*a*) is connected to the downstream-side main information terminal 12 (*a*M) by an internal wiring Lm.

Referring to a first example shown in FIG. 1A, the downstream-side other information terminal 12 (*a*0) is connected to the upstream-side first information terminal 14 (*a*-1) in each connector member 4. That is, in each connector member 4, the upstream-side first information terminal 14 (*a*-1) and the downstream-side other information terminal 12 (*a*0) are connected by a shift wiring L (sif) so that the terminals are shifted. A connection cable 16 connecting the upstream-side second connector member 4 (2) to the first connector member 4 (1) has a straight wiring 16*a*. A downstream-side main information terminal 2 (aM) of the second connector member 4 (2) is connected to the upstream-side first information terminal 14 (*a*-1) of the first connector member 4 (1) by the straight wiring 16*a*.

According to the above configuration, information relating to the first safety component 2 (1) can be inputted and outputted through the component-side main information terminal 6 (*a*) and the downstream-side main information terminal 12 (*a*M) of the first connector member 4 (1) corresponding to the first safety component 2 (1) in the first example shown in FIG. 1A. On the other hand, information relating to the second safety component 2 (2) positioned on the upstream side can be inputted or outputted through the component-side main information terminal 6 (*a*) and the downstream-side main information terminal 12 (*a*M) of the second connector member 4 (2) corresponding to the first safety component 2 (2), the cable 16, the upstream-side first information terminal 14 (*a*-1) of the first connector member 4 (1), the internal shift wiring L (Sif) and the downstream-side other information terminal 12 (*a*0).

As can be seen from the above explanation, the controller 10 receives information obtained through the downstream-side main information terminal 12 (*a*M) of the first connector member 4 (1) positioned on the downmost-stream side, thereby recognizing that the information is information relating to the first safety component 2 (1).

Similarly, the controller 10 receives information obtained through the downstream-side other information terminal 12 (*a*0) of the first connector member 4 (1), thereby recognizing that the information is information relating to the second safety component 2 (2).

Therefore, the controller 10 can monitor the first safety component 2 (1) or the second safety component 2 (2) individually through the downstream-side main information terminal 12 (*a*M) or the downstream-side other information terminal 12 (*a*0) of the first connector member 4 (1) as well as can supply control signals (for example, control signals for turning on/off display lamps of respective components 2 or a control signal for releasing locking in a case of the safety door switch) to the first safety component 2 (1) or the second safety component 2 (2) individually.

Referring to FIG. 1B, the downstream-side other information terminal 12 (*a*0) is connected to the upstream-side second information terminal 14 (*a*-2) by a straight internal wiring L (str) in each connector member 4 in the shown example. On the other hand, the connection cable 16 includes a cable shift wiring 16*b*, and the downstream-side main information terminal 12 (*a*M) of the second connector member 4 (2) is connected to the upstream-side second information terminal 14 (*a*-2) of the first connector member 4 (1) by the cable shift wiring 16*b*.

As can be immediately found by the example shown in FIG. 1B, the upstream-side first information terminal 14 (*a*-1) may be omitted from each connector member 4.

Also in the example shown in FIG. 1B, information relating to the first safety component 2 (1) can be inputted and outputted through the downstream-side main information terminal 12 (*a*M) of the first connector member 4 (1) corresponding to the first safety component 2 (1) in the same manner as the above-described example shown in FIG. 1B. On the other hand, information relating to the second safety component 2 (2) positioned on the upstream side can be inputted and outputted through the downstream-side other information terminals 12 (*a*0) of the first connector member 4 (1) due to the existence of the cable shift wiring 16*b* (FIG. 1B) connecting between the downstream-side main information terminal 12 (*a*M) of the second connector member 4 (2) and the upstream-side second information terminal 14 (*a*-2) of the first connector member 4 (1).

Referring to FIGS. 1A and 1B, the second connector member 4 (2) including the connection cable 16 can be conceptualized as a "connection part" concerning the upstream-side second connector member 4 (2) connected to the downstream-side first connector member 4 (1). As the first connector member 4 (1) is generally connected to the controller 10 by the connection cable 10, the first connector member 4 (1) including the connection cable 16 between the controller 10 can be naturally conceptualized as a "connection part".

According to the conceptualization, the connection part on the upstream side and the connection part on the downstream side in the examples shown in FIGS. 1A and 1B respectively include the following elements.

(1) Each connection part includes the downstream-side main information terminal giving and receiving information of the safety component corresponding to the connection part and transmitting the information.

(2) Each connection part also includes the downstream-side other information terminals 12 capable of inputting and outputting information so as to correspond to respective safety components positioned on the upstream side.

In the explanation of the concept of the present invention with reference to FIGS. 1A and 1B, the explanation has been made on the assumption that the connector member 4 is a separate member from the safety component 2, however, a configuration in which the connector member 4 is incorporated in the safety component 2 and the safety component 2 includes the connector part may be adopted. In this case, respective terminals included in the component-side terminal group 6 may be replaced with wirings. Accordingly, for example, when the above component-side main information terminal 6 (*a*) of the connector member 4 is configured by wiring, the section will be a component a "component-side main information giving/receiving section".

Other objects and operation and effect of the present invention will be cleared in the following explanation of preferred embodiments.

BRIEF DESCRIPTION OF THE DRAWINGS

FIGS. 1A and 1B are diagrams for explaining the concept of the present invention, in which FIG. 1A shows an example in which a connector member includes an internal shift wiring and FIG. 1B shows an example in which a connection cable includes a shift wiring;

DESCRIPTION OF EMBODIMENTS

Embodiments

Preferred plural embodiments and modification examples of the present invention will be explained with reference to the attached drawings. Respective embodiments and the modification examples will be explained while giving the same reference sighs to substantially the same components as components explained with reference to FIGS. 1A and 1B.

Figure 2:
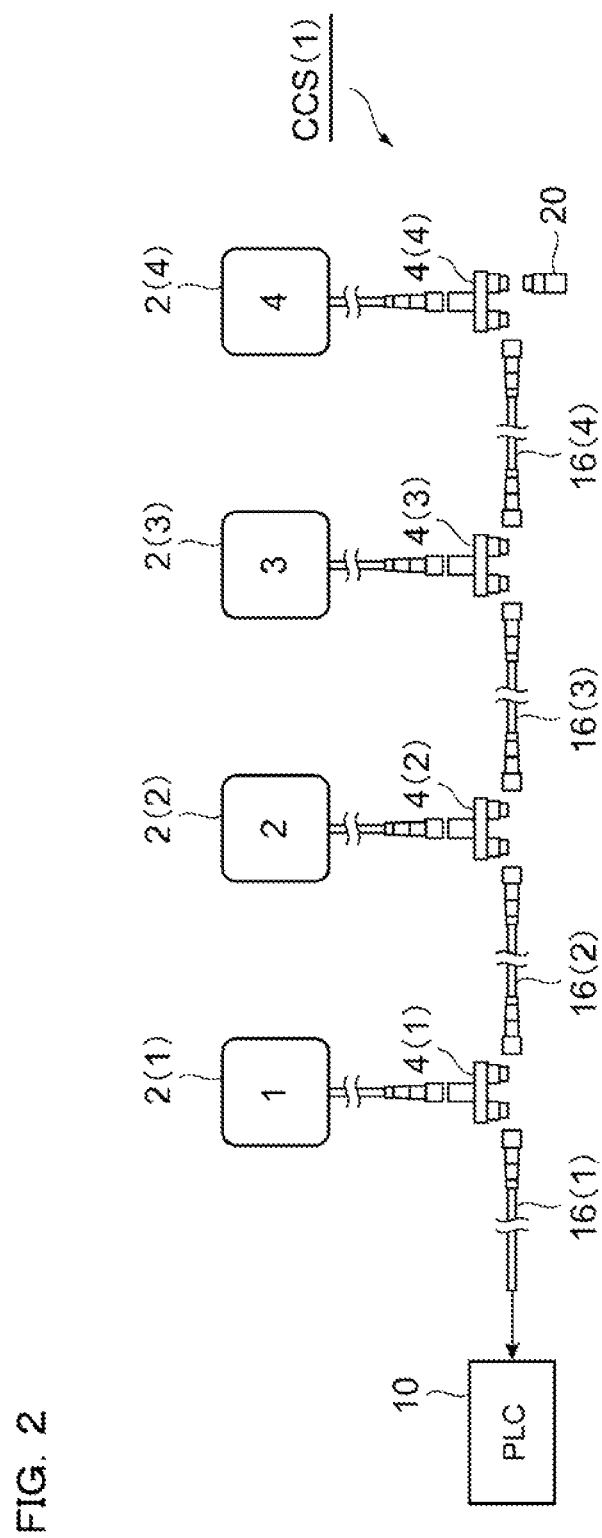
FIG. 2 is a schematic explanation view showing a serial cascade connector system according to a first embodiment, a controller and plural safety components connected by the system.
Figure 3:
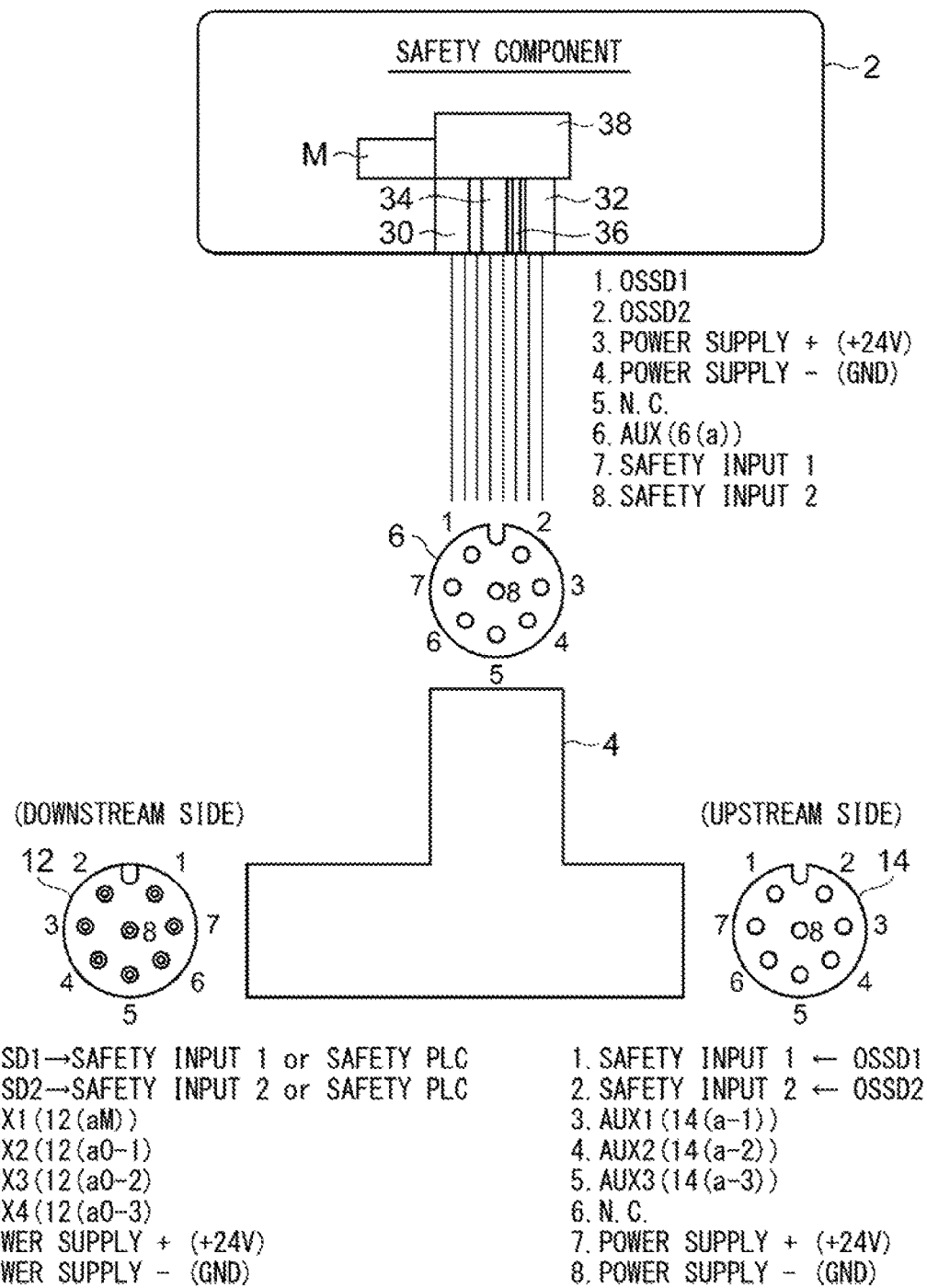
FIG. 3 is a diagram for explaining respective connection terminal groups of a Y-shaped connector member included in the first embodiment.
Figure 4:
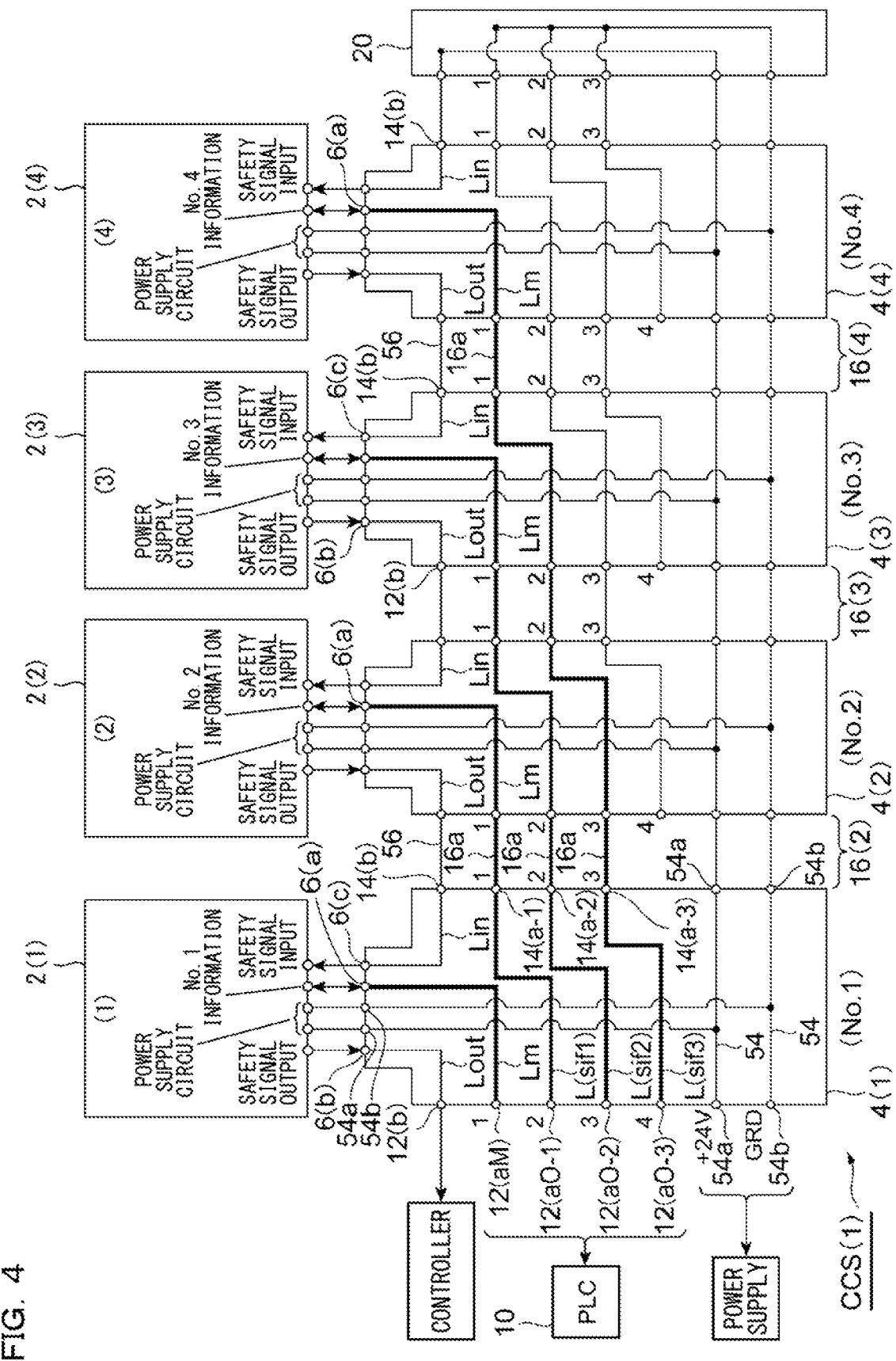
FIG. 4 is a diagram for explaining information wirings and information terminals included in Y-shaped connector members and connection cables included in the serial cascade connector system shown in FIG. 3.

FIG. 2 to FIG. 4 show a serial cascade connector system CCS (1) according to a first embodiment. Referring to FIG. 2, the serial cascade connector system CCS (1) can be applied for connecting the arbitrary number of safety components 2 (1) to 2 (4) of four or less.

The serial cascade connector system CCS (1) includes first to fourth Y-shaped connector members 4 (1) to 4 (4) which are in common in order from a controller 10. Each connector member 4 typically has three terminal groups called "Y-shaped connectors" or "T-shaped connectors", and circular connectors each having eight cores in number of terminals are typically provided in respective terminal groups. The number of terminals of each circular connector forming each terminal group is not limited to eight cores, and the number of terminals may be twelve cores or sixteen cores. In these case, the number of cores of information terminals can be eight cores or twelve cores.

An end member 20 is connected to the fourth Y-shaped connector member 4 (4) positioned on the uppermost-stream side, namely, farthest from the controller 10 in the Y-shaped connector members 4 (1) to 4 (4). A circuit of the serial cascade connector system CCS (1) is closed by the end member 20.

The serial cascade connector system. CCS (1) includes four common connection cables 16 (1) to 16 (4). The first connection cable 16 (1) is used for connecting the first connector member 4 (1) on the downmost-stream side to the controller 10. The second connection cable 16 (2) is used for connecting the second connector member 4 (2) positioned on the upstream side of the first connector member 4 (1) to the first connector member 4 (1). The third connection cable 16 (3) is used for connecting the third connector member 4 (3) positioned on the upstream side of the second connector member 4 (2) to the second connector member 4 (2). The fourth connection cable 16 (4) is used for connecting the fourth connector member 4 (4) positioned on the upstream side of the third connector member 4 (3) and farthest from the controller 10 to the third connector member 4 (3).

FIG. 3 is a diagram for explaining terminals included in each connector member 4 and the safety component 2 corresponding to this. When the shown safety component 2 is, for example, a non-contact type safety component such as a safety door switch or a light curtain, the safety component 2 includes a semiconductor switching device 30 outputting a safety signal and a safety signal receiving section 32 receiving the safety signal from an adjacent upstream-side safety component 2, which become redundant by duplicating the wiring. Shown "OSSD 1" and "OSSD 2" mean safety signals relating to the semiconductor switching device 30. The safety component 2 further includes a power supply section 34, and power is supplied to the power supply section 34 through the serial cascade connector system. CCS (1).

The safety component 2 further includes an information giving/receiving section 36, a control section 38 and a memory M. Identification information assigned to each safety component 2 and so on are recorded in the memory M. The information giving and receiving section 36 outputs identification information of each safety component 2 itself, and receives information from the controller 10, which includes, for example, a control signal for turning on or off display lamps included in each safety component 2 and a control signal for operating a lock mechanism included in the safety door switch. A terminal relating to the signal line is shown as "6. AUX".

Each Y-shaped connector member 4 includes a component-side terminal group 6 used for being connected to a corresponding safety component 2. The component-side terminal group 6 is formed of a female coupling member. Shown "6. AUX" corresponds to the above component-side main information terminal 6 (*a*).

Each Y-shaped connector member 4 has a common structure and includes a downstream-side terminal group 12 shown on the left side in the drawing. Shown "3. AUX 1" corresponds to the above downstream-side main information terminal 12 (*a*M). Moreover, "4. AUX2" to "6. AUX4" correspond to the above downstream-side other information terminals 12 (*a*0). In the embodiment, the downstream-side other information terminals 12 (*a*0) include three terminals "4. AUX2"" (12 (*a*0-1)), "5. AUX3" (12 (*a*0-2)) and "6. AUX4" (12 (*a*-3)). The downstream-side terminal group is formed of a male coupling member.

Each y-shaped connector member 4 includes an upstream-side terminal group 14 shown on the right side in the drawing. Shown "3. AUX 1" to "5. AUX 3" correspond to the above upstream-side information terminals 14 (*a*). In the embodiment, the upstream-side information terminals 14 (*a*) include three terminals "3. AUX 1", "4. AUX 2" and "5. AUX 3". Reference signs 14 (*a*-1), 14 (*a*-2) and 14 (*a*-3) are added to these respective terminals to be associated with the above explanation of FIGS. 1A and 1B. The upstream-side terminal group 14 is formed of a female coupling member.

FIG. 4 is a diagram for explaining physical wiring of the serial cascade connector system CCS (1) according to the first embodiment. Wiring relating to the safety signal is shown by one wiring for avoiding complication of the drawing, which should be understood that the wiring becomes redundant. In the drawing, reference signs 54 indicate power supply lines. The power supply lines 54 extend continuously in the serial cascade connector system CCS (1) in the same manner as in related art. A power supply of DC 24V is supplied to respective safety components 2 corresponding to respective connector members 4 through respective connector members 4 by the power supply lines 54. A +24V terminal and an earth terminal of each connector member 4 is shown by reference signs 54*a* and 54*b*.

In the drawing, reference signs 56 indicate safety signal lines. The safety signal lines 56 are duplicated, however, they are shown by one wiring for avoiding complication of the diagram. Each connector member 4 includes a safety signal receiving terminal 6 (*b*) and a safety signal delivery terminal 6 (*c*) in the component-side terminal group 6. Each connector member 4 also includes a safety signal output terminal 12 (*b*) in the downstream-side terminal group 12. Each connector member 4 further includes a safety signal receiving terminal 14 (*b*) in the upstream-side terminal group 14.

In each connector member 4, the safety signal receiving terminal 14 (*b*) in the upstream-side terminal group 14 and the safety signal delivery terminal 6 (*c*) in the component-side terminal group 6 are connected by a safety signal wiring Lin. The safety signal is received from the upstream-side safety component 2 by the safety signal receiving terminal 14 (*b*) in the upstream-side terminal group 14, and the safety signal is supplied to the corresponding safety component 2 through the safety signal delivery terminal 6 (*c*) in the component-side terminal group 6. Then, the safety signal outputted from the safety component 2 is outputted from the safety signal output terminal 12 (*b*) in the downstream-side terminal group 12 through the safety signal receiving terminal 6 (*b*) in the component-side terminal group 6 and an internal wiring Lout.

That is, the safety signal outputted from the fourth safety component 2 (4) positioned on the uppermost-stream side is inputted to the third safety component 2 (3), subsequently, the safety signal outputted from the third safety component 2 (3) is inputted to the second safety component 2 (2), then, the safety signal outputted from the second safety component 2 (2) is inputted to the first safety component 2 (1) and the safety signal outputted from the first safety component 2 (1) is inputted to the controller 10.

Figure 1A:
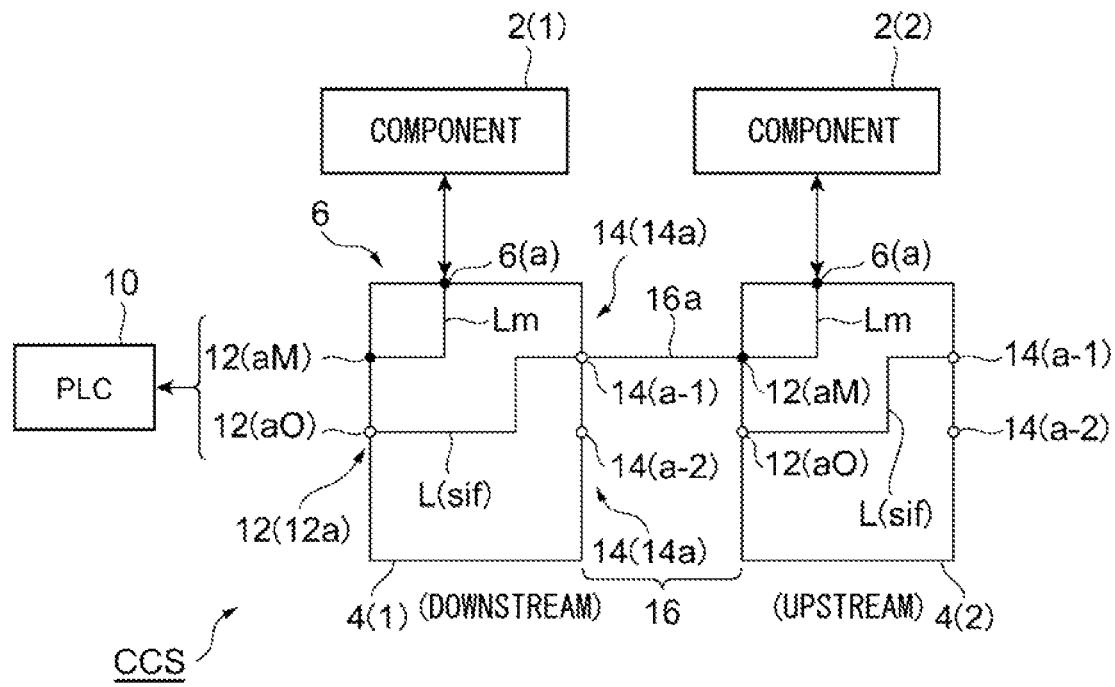

As shown in FIG. 4, in the serial cascade connector system CCS (1) according to the first embodiment, three upstream-side information terminals 14 (*a*) are respectively connected to three downstream-side other information terminals 12 (*a*0) by three internal shift wirings L (sif) in the internal wiring of each connector member 4 as explained in FIG. 1A. Specifically, the upstream-side first information terminal 14 (*a*-1) is connected to the first downstream-side other information terminal 12 (*a*0-1) by the first internal shift wiring L (sif1). The upstream-side second information terminal 14 (*a*-2) is connected to the second downstream-side other information terminal 12 (*a*0-2) by the second internal shift wiring L (sif2). The upstream-side third information terminal 14 (*a*-3) is connected to the third downstream-side other information terminal 12 (*a*0-3) by the first internal shift wiring L (sif3).

Moreover, respective connection cables 16 included in the serial cascade connector system CCS (1) according to the first embodiment are common, and respective connection cables 16 are formed of straight wirings 16*a* explained with reference to FIG. 1A.

Concerning the safety signal sequentially supplied to the downstream side, the control section 38 (FIG. 3) of each safety component 2 performs an "and" operation to the safety signal received from the upstream side and a state detected by the safety component 2 to output the signal to the downstream side. In a case where the safety signal received from the upstream side is the "operation permission signal" and the state detected by the safety component 2 is the "operation permission state", the "operation permission signal", namely, the "ON" signal is outputted from the safety component 2. In cases of combinations other than the above, the "operation non-permission signal", namely, the "OFF" signal is outputted from the safety component 2. Therefore, the first safety component 2 (1) positioned on the downmost-stream side combines the safety signal from the upper-stream side with the state detected by the first safety component 2 (1) to output the safety signal to the controller 10.

In the serial cascade connector system CCS (1) according to the first embodiment, information from the second to fourth safety components 2 (2) to 2 (4) positioned on the upstream side can be individually supplied to the controller 10 via the internal shift wirings L (sif) of respective connector members 4 through the first to third downstream other information terminals 12 (*a*0-1) to 12 (*a*0-3) of the first connector member 4 (1) positioned on the downmost-stream side. Information of the first safety component 2 (1) positioned on the downmost-stream side can be supplied through the downstream-side main information terminal 12 (*a*M) of the first connector member 4 (1) corresponding to the first safety component 2 (1). Therefore, the controller 10 can monitor the respective safety components 2 (1) to 2 (4) individually. Information such as a control signal can be individually supplied from the controller 10 to respective safety components 2 (1) to 2 (4).

Figure 5:
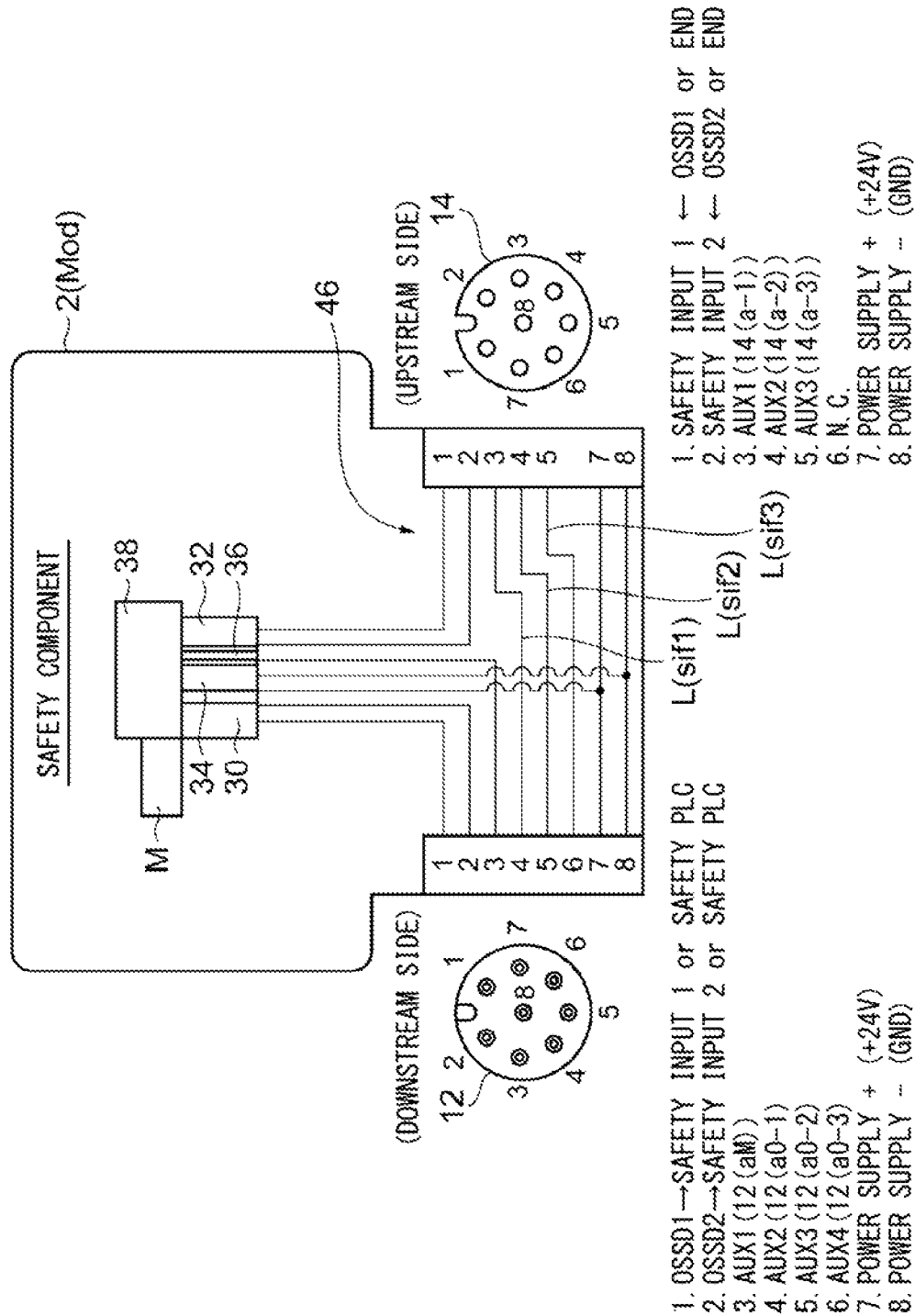
FIG. 5 is a diagram for explaining a configuration of a safety component incorporating functions of the connector member.

Each safety component 2 may include a corresponding connector member 4. FIG. 5 shows a safety component 2 (Mod) according to a modification example in which the connector member 4 is incorporated in the safety component 2. The safety component 2 (Mod) according to the modification example has a connecting section 46 corresponding to the connector member 4. The connecting section 46 includes plural internal wirings connected to the power supply section 34 and the control section 38 included in the safety component 2 (Mod), and these are connected to respective terminals in the downstream-side terminal group 12 and the upstream-side terminal group 14 of the connecting section 46.

As described with reference to FIG. 3 and FIG. 4, three upstream-side information terminals 14 (*a*) are connected to three downstream-side other information terminal 12 (*a*0) respectively by three internal shift wirings L (sif) in the connecting section 46 shown in FIG. 5 in the same manner as the internal wiring of respective connector members 4 according to the first embodiment. Specifically, the upstream-side information terminal 14 (*a*-1) is connected to the first downstream-side other information terminal 12 (*a*0-1) by the first internal shift wiring L (sif1). The upstream-side second information terminal 14 (*a*-2) is connected to the second downstream-side other information terminal 12 (*a*0-2) by the second internal shift wiring L (sif2). The upstream-side third information terminal 14 (*a*-3) is connected to the third downstream-side other information terminal 12 (*a*0-3) by the first internal shift wiring L (sif3).

Also in the safety component 2 (Mod) according to the modification example shown in FIG. 5, the same connection cables 16 used in the serial cascade connector system CCS (1) according to the first embodiment are adopted. That is, respective connection cables 16 are formed of the above straight wirings 16*a*.

When the safety component 2 (Mod) according to the modification example shown in FIG. 5 and the connection cables 16 formed of the straight wirings 16*a* are used, information can be given and received between plural safety components 2 (Mod) and the controller 10 individually through the downstream-side main information terminal 12 (*a*M) and the first to third downstream-side other information terminals 12 (*a*0-1) to 12 (*a*0-3) included in the downstream-side terminal group 12 of the connecting section 46 of the safety component 2 (Mod) positioned on the downmost-stream side.

Figure 6:
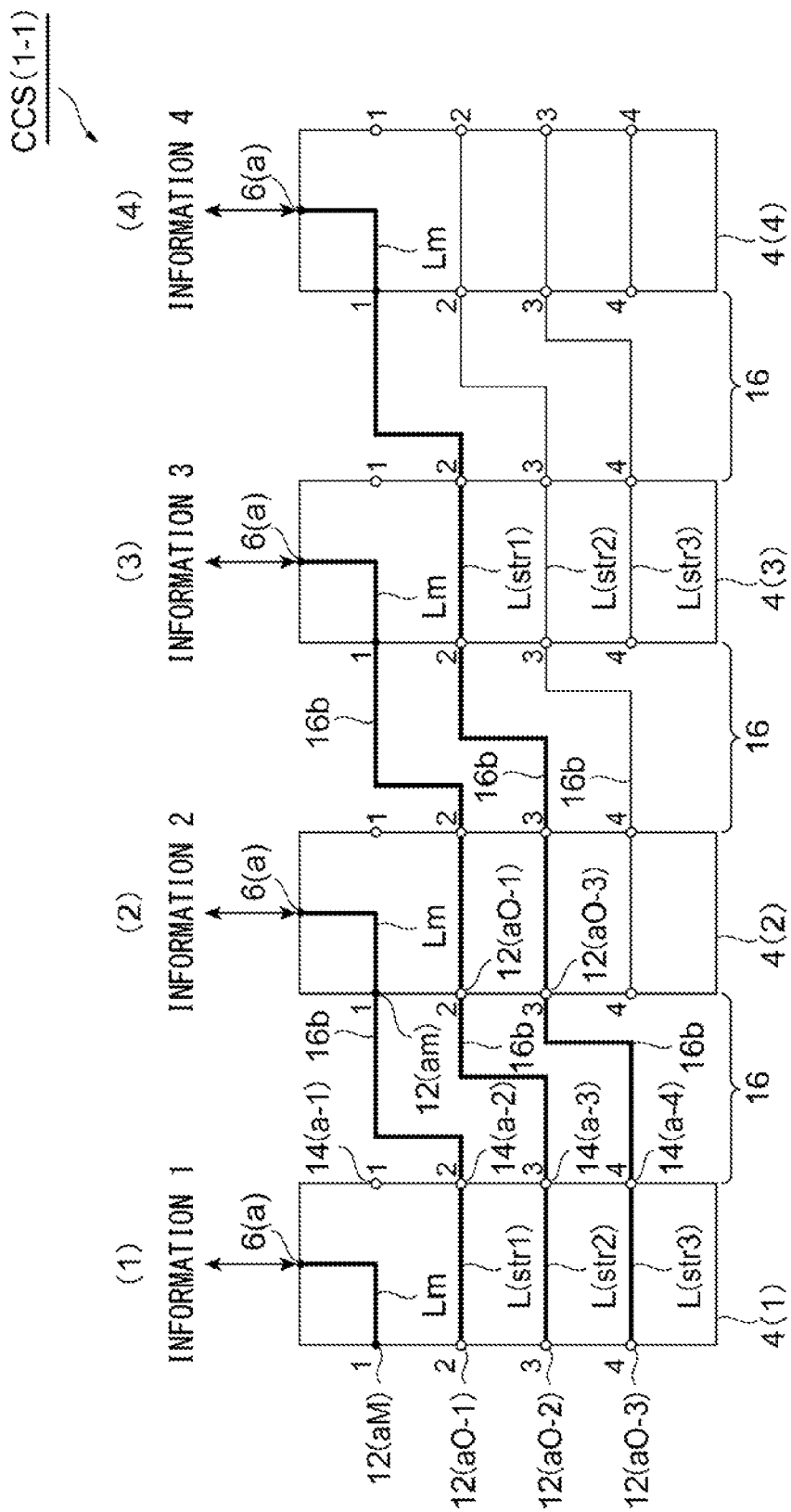
FIG. 6 is a diagram for explaining a modification example of the serial cascade connector system shown in FIG. 3.

FIG. 6 shows the serial cascade connector system CCS (1-1) according to the modification example. In FIG. 6, wirings relating to giving/receiving of information are extracted and drawn. The connection cables 16 included in the serial cascade connector system CCS (1-1) shown in FIG. 6 are formed of the cable shift wirings 16*b* explained with reference to FIG. 1B.

In each of connector members 4 included in the serial cascade connector system CCS (1-1) according to the modification example, three upstream-side information terminals 14 (*a*) are respectively connected to three downstream-side other information terminals 12 (*a*0) by three straight internal lines L (str). Specifically, the upstream-side second information terminal 14 (*a*-2) is connected to the first downstream-side other information terminal 12 (*a*0-1) by the first straight internal wiring L (str1). The upstream-side third information terminal 14 (*a*-3) is connected to the second downstream-side other information terminal 12 (*a*0-2) by the second straight internal wiring L (str2). The upstream-side fourth information terminal 14 (*a*-4) is connected to the third downstream-side other information terminal 12 (*a*0-3) by the third straight internal wiring L (str3).

Figure 1B:
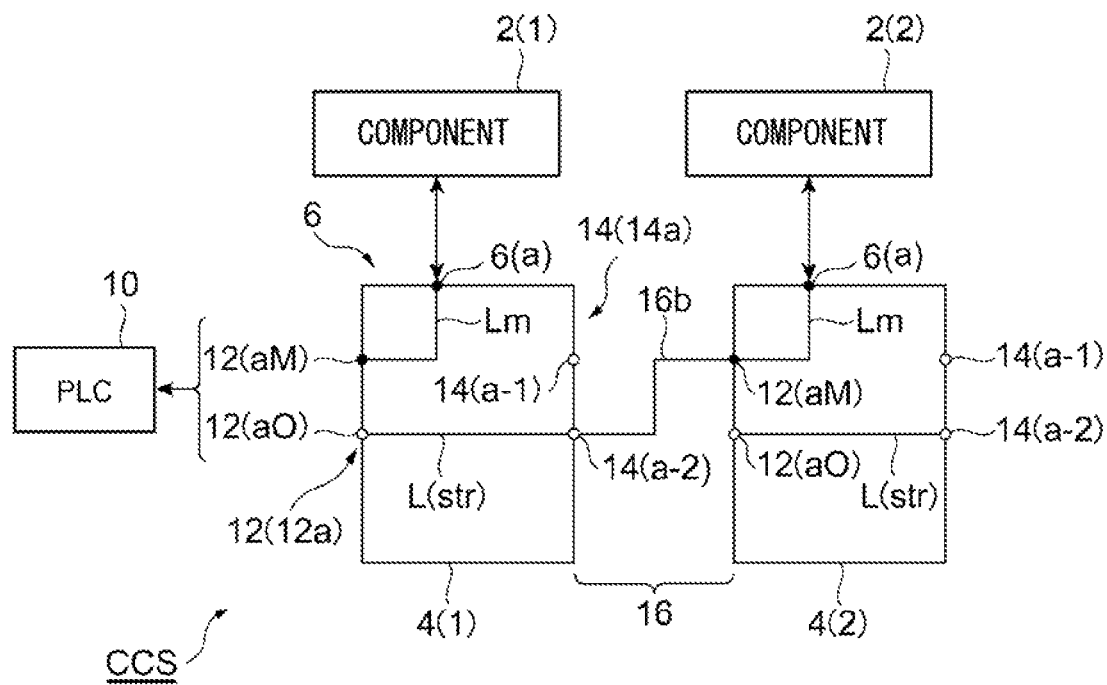

Also in the serial cascade connector system CCS (1-1) according to the modification example, the controller 10 can monitor respective safety components 2 (1) to 2 (4) individually and can supply information such as the control signal individually from the controller 10 to respective safety components 2 (1) to 2 (4) as explained with reference to FIG. 1B.

Four safety components 2 (1) to 2 (4) at the maximum can be connected in series by using the serial cascade connector systems CCS (1) and CCS (1-1) according to the first embodiment and the modification example thereof. Next, a serial cascade connector system CCS (2) according to a second embodiment capable of further adding plural safety components 2 will be explained.

Figure 7:
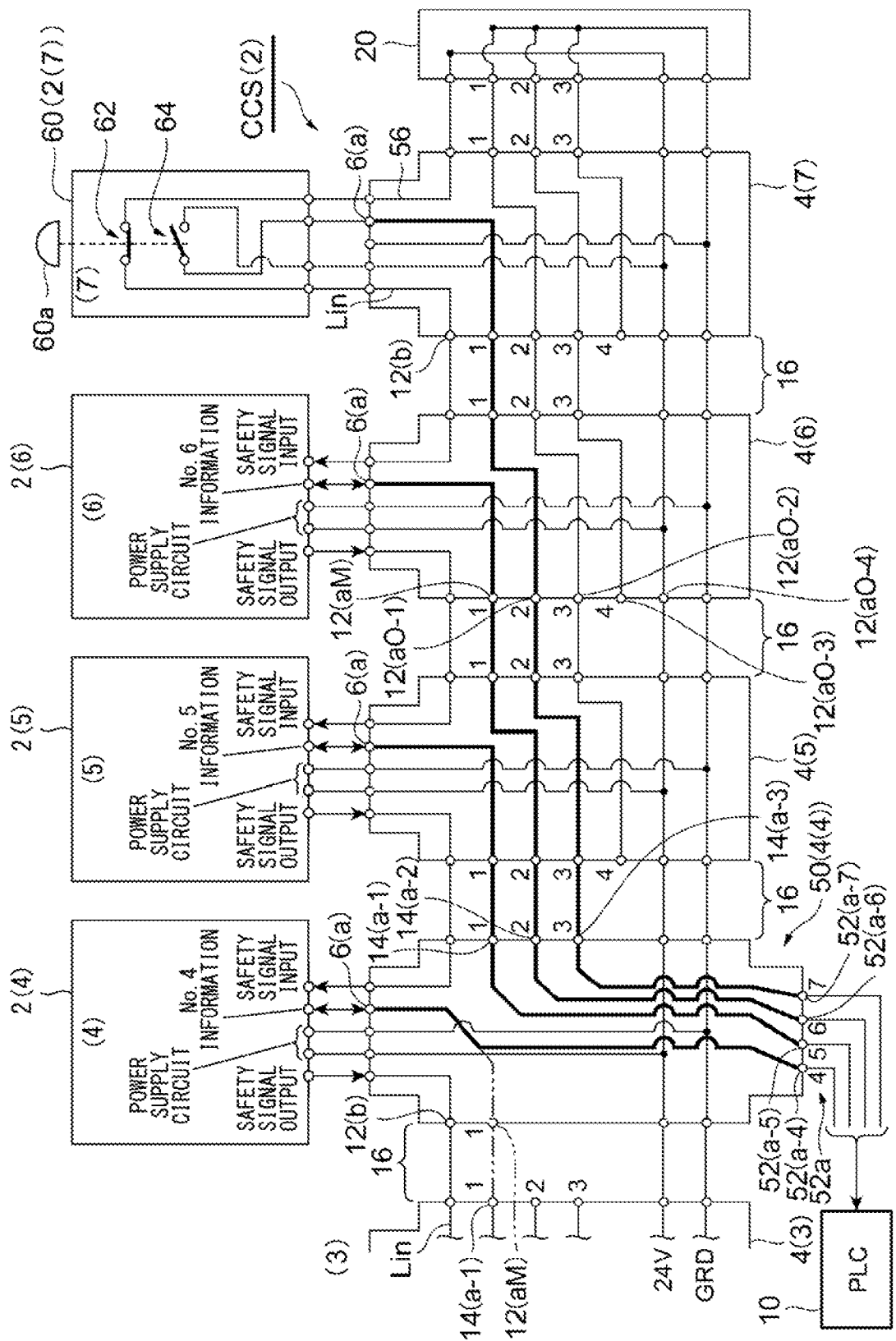
FIG. 7 is a diagram for explaining a relay connector member which can be applied when installing three more safety components in addition to four safety components connected in series shown in FIG. 4.

FIG. 7 is a diagram showing part of the serial cascade connector system CCS (2) according to the second embodiment. In the shown serial cascade connector system CCS (2), the first to third connector members 4 (1) to 4 (3) which are not shown and fifth to seventh connector members 4 (5) to 4 (7) shown in FIG. 7 are common, therefore, explanation thereof is omitted.

The serial cascade connector system CCS (2) according to the second embodiment is configured so that the connector member 4 (4) corresponding to the fourth safety component is formed of a relay connector member 50.

The relay connector member 50 includes an expansion-side information terminal group 52. The expansion-side information terminal group 52 includes four expansion-side information terminals 52*a* capable of giving and receiving information between each of fifth to seventh safety components 2 (5) to 2 (7) corresponding to each of the fifth to seventh connector members 4 (5) to 4 (7) positioned on the upstream side of the relay connector member 50 in addition to the fourth safety component 2 (4) corresponding to the relay connector member 50 and the controller 10.

In order to distinguish the shown four expansion-side information terminals 52*a*, "-4" to "-7" are added in conjunction with corresponding fourth to seventh safety components 2 (4) to 2 (7) to be shown. That is, an expansion-side first information terminal 52 (*a*-4) corresponds to the fourth safety component 2 (4). An expansion-side second information terminal 52 (*a*-5) corresponds to the fifth safety component 2 (5). An expansion-side third information terminal 52 (*a*-6) corresponds to the sixth safety component 2 (6). An expansion-side fourth information terminal 52 (*a*-7) corresponds to the seventh safety component 2 (7).

In the relay connector member 50, the upstream-side first information terminal 14 (*a*-4) is connected to the component-side main information terminal 6 (*a*). The expansion-side second information terminal 52 (*a*-5) is connected to the upstream-side first information terminal 14 (*a*-1). The expansion-side third information terminal 52 (*a*-6) is connected to the upstream-side second information terminal 14 (*a*-2). The expansion-side fourth information terminal 52 (*a*-7) is connected to the upstream-side third information terminal 14 (*a*-3).

In the above serial cascade connector system CCS (2) according to the second embodiment, the first to third safety components 2 (1) to 2 (3) can supply information individually to the controller 10 through the downstream-side main information terminal 12 (*a*M) and the first and second downstream-side other information terminals 12 (*a*0-1) and 12 (*a*0-2) of the connector member 4 (1) positioned on the downmost-stream side. Therefore, the controller 10 can monitor the first to third safety components 2 (1) to 2 (3) individually. Moreover, the controller 10 can supply information such as the control signal to the first to third respective safety components 2 (1) to 2 (3) individually.

In the relay connector member 50 included in the serial cascade connector system CCS (2), the configuration in which the component-side main information terminal 6 (*a*) is connected to the expansion-side first information terminal 52 (*a*-4) is adopted as described above. As a modification example, the expansion-side first information terminal 52 (*a*-4) is omitted and the downstream-side main information terminal 12 (*a*M) is provided in the relay connector member 50 and the downstream-side main information terminal 12 (*a*M) may be connected (shown by a virtual line) to the component-side main information terminal 6 (*a*). According to the modification example, giving/receiving of information with respect to the fourth safety component 2 (4) corresponding to the relay connector member 50 can be performed through the third downstream-side information terminal 12 (*a*0-3) of the first connector member 4 (1) as explained with reference to FIG. 4.

Also in the serial cascade connector system CCS (2) according to the second embodiment, the controller 10 can monitor the fourth to seventh safety components 2 (4) to 2 (7) individually through the first to fourth expansion-side information terminals 52 (*a*-4) to 52 (*a*-7) of the relay connector member 50, and the controller 10 can supply information such as the control signal to the fourth to seventh safety components 2 (4) to 2 (7) individually.

In FIG. 4 and FIG. 7, the first to sixth safety components 2 (1) to 2 (6) are typically non-contact type safety components outputting ON/OFF signals by the semiconductor switching device, which are, for example, safety door switches or multiple optical-axis photoelectric sensors. On the other hand, an emergency stop switch 60 as a contact-type safety component is illustratively shown as the seventh safety component 2 (7) shown in FIG. 7. The contact-type safety component has a contact which is mechanically opened and closed as described above. The shown emergency stop switch 60 includes a main switch 62 formed of a normally closed contact for closing the safety signal line 56 and an information switch 64 formed of a normally open contact.

The emergency stop switch 60 has an operation section 60*a* operated by an operator. When the operation section 60*a* is pressed down by the operator, the main switch 62 (normally closed contact) is mechanically opened, and the information switch 64 (normally open contact) is closed on the other hand. A close signal of the information switch 64 is inputted to the component-side main information terminal 6 (*a*) of the corresponding seventh connector member 4 (7).

The safety component 2 shown in FIG. 3 includes the control section 38 and the semiconductor switching device 30, and the safety signal is outputted from the switching device 30. On the other hand, the safety signal is outputted through the main switch 62 formed of the normally closed contact in the emergency stop switch 60 shown in FIG. 7.

Figure 8:
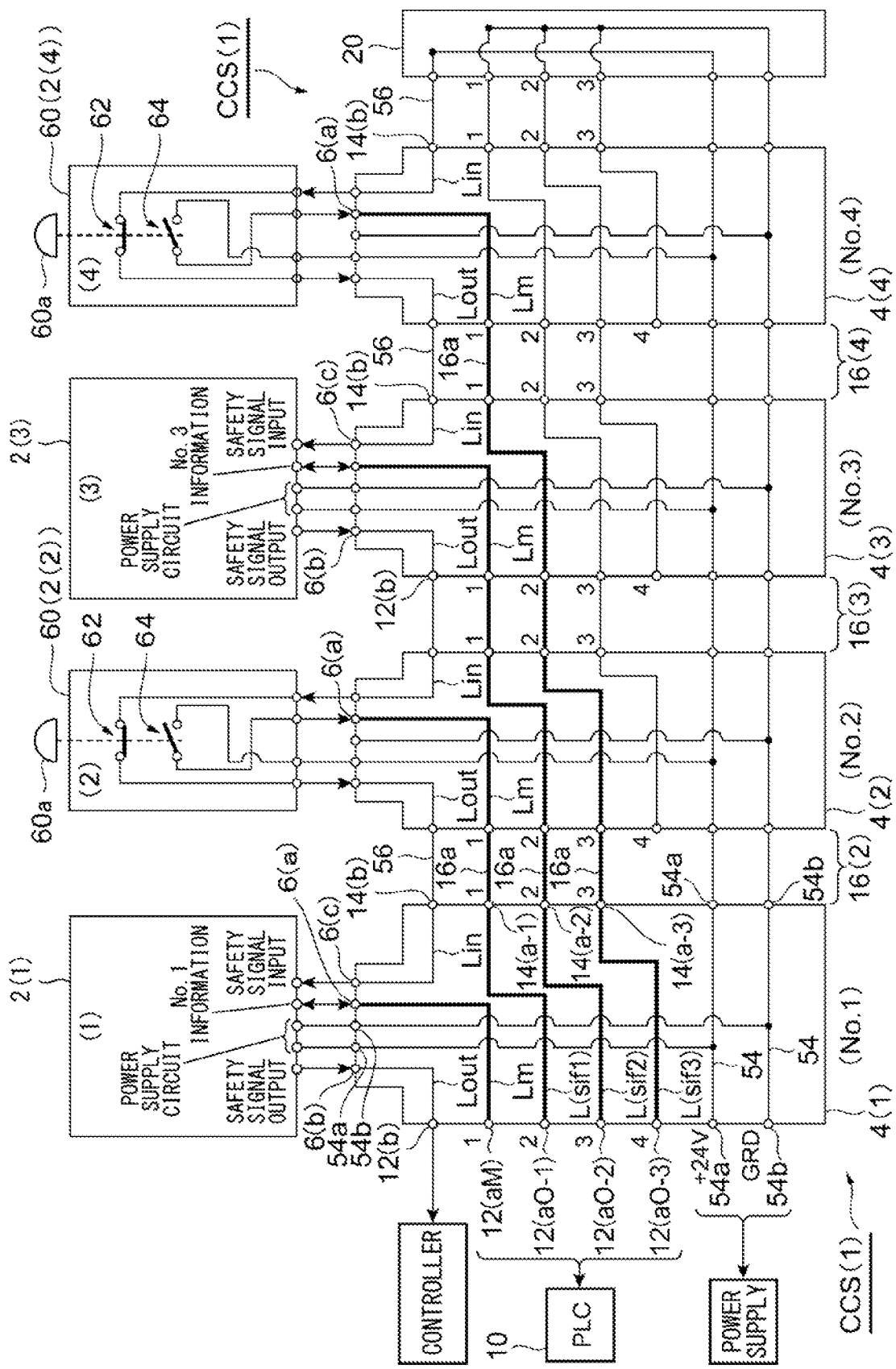
FIG. 8 is a diagram for explaining an application example in which connection is performed by using a serial cascade connector system by taking a combination of a safety component including a semiconductor switching device and an emergency stop switch as one unit.

FIG. 8 shows an example in which combinations of the non-contact type safety component 2 having the semiconductor switching device 30 and the contact-type safety component such as the emergency stop switch 60 are connected in series by using the serial cascade connector system CCS (1).

Although the serial cascade connector system CCS (1) according to the first embodiment is shown in FIG. 8, it is naturally possible to apply the serial cascade connector system CCS (1-1) (FIG. 6) according to the modification example.

In the example shown in FIG. 8, the first safety component 2 (1) is a non-contact type safety component including the control section 38, the semiconductor switching device and so on, which is, for example, the multiple optical-axis photoelectric sensor, the non-contact type safety door switch, the mat switch or the laser scanner. The second component 2 (2) on the upstream side of the above is formed of a contact-type safety component, which is, for example, the contact-type safety door switch or the emergency stop switch 60. The third safety component 2 (3) is the non-contact type safety component and the fourth component 2 (4) on the upstream side thereof is formed of the emergency stop switch 60.

Figure 9:
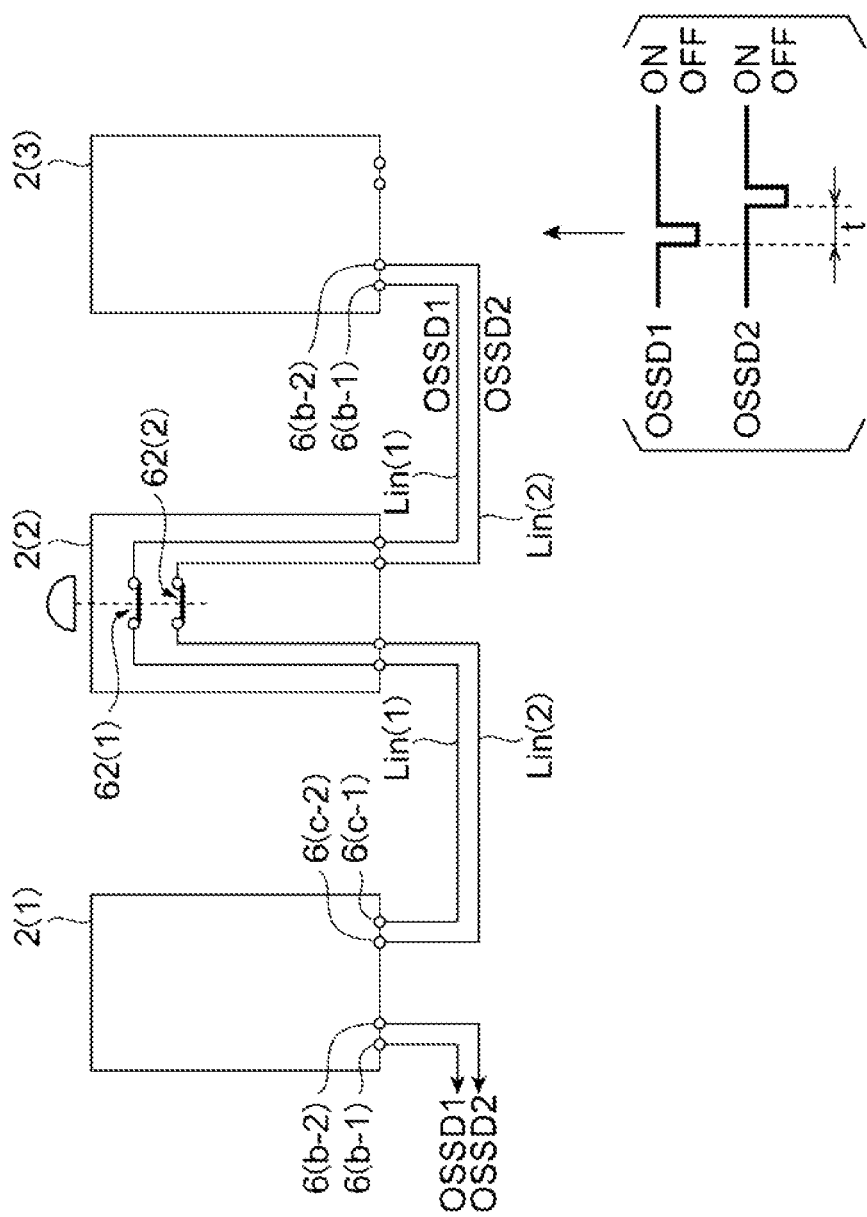
FIG. 9 is a diagram for explaining an example of detecting a fault by incorporating a contact-type safety component into the serial cascade connector system, showing an example of fault detection control when a main switch of the contact-type safety component is "ON"
Figure 10:
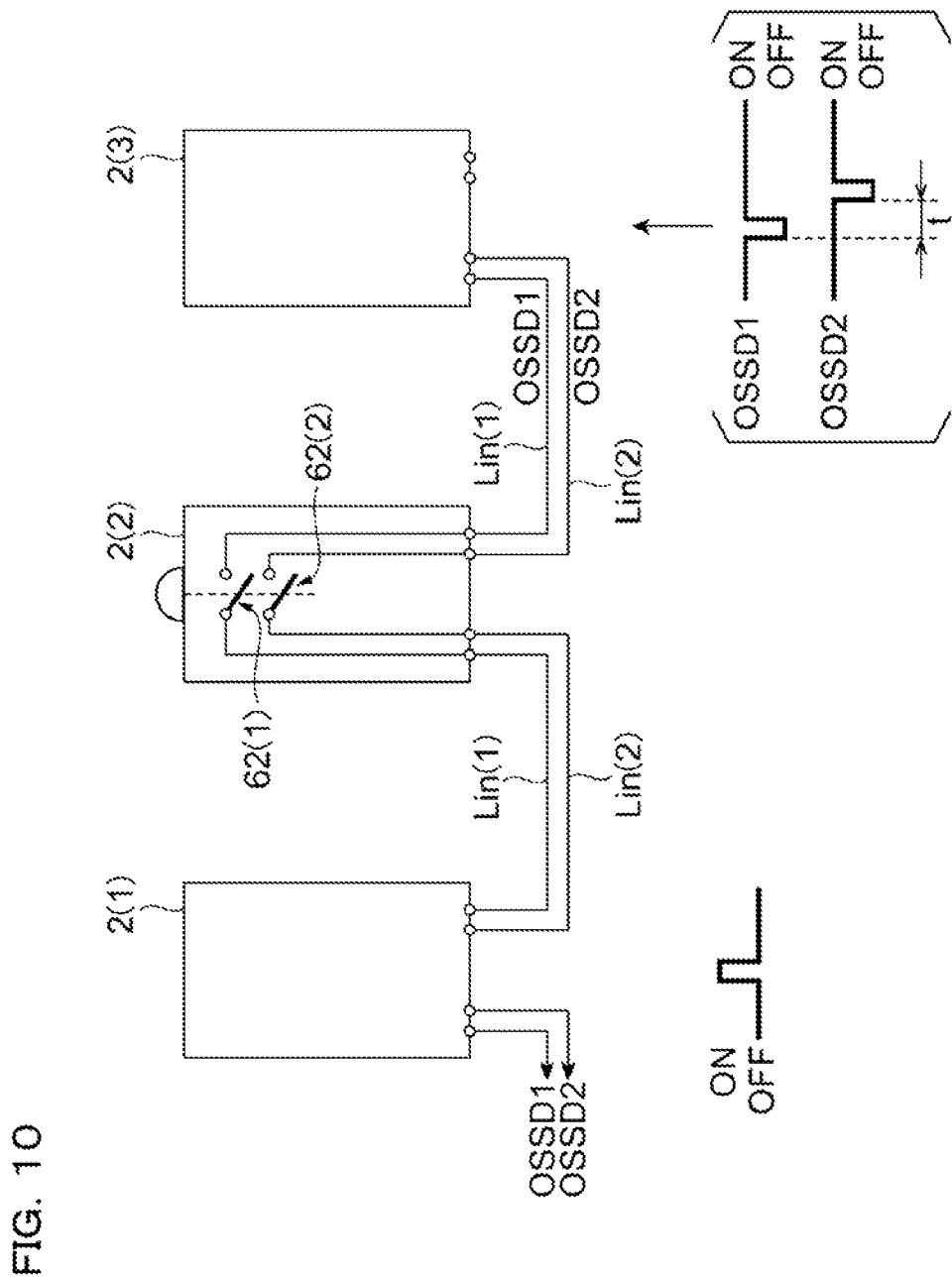
FIG. 10 is a diagram for explaining an example of detecting a fault by incorporating the contact-type safety component into the serial cascade connector system in the same manner as FIG. 9, showing an example of fault detection control when the main switch of the contact-type component is "OFF"

FIG. 9 and FIG. 10 are diagrams for explaining other advantages obtained by incorporating the non-contact safety components and the contact-type safety components in the serial cascade connector system CCS (1). In FIG. 9 and FIG. 10, the first safety component 2 (1) and the third safety component 2 (3) are non-contact type safety components and the second safety component 2 (2) is the contact-type safety component (for example, the emergency stop switch and the contact-type safety door switch).

FIG. 9 and FIG. 10 are diagrams for explaining an example in which a test pulse for detecting a short-circuit fault between systems is supplied from the controller 10 to the third safety component 2 (3) to find a fault. Note that the information switch 64 is not shown for avoiding complication of the drawings in FIG. 9 and FIG. 10. Moreover, duplicated safety signal wirings Lin are shown in FIG. 9 and FIG. 10.

FIG. 9 is a diagram for explaining an example in which a test pulse is supplied to the third safety component 2 (3) when the main switch 62 of the second safety component 2 (2) (for example, the emergency stop switch) is "ON" to allow signals of the second safety signal wirings Lin (1) and Lin (2) to be "OFF" momentarily with a time difference (t) to thereby detect a fault. In a case where an "OFF" waveform does not appear in safety signals of two systems outputted from the first safety component 2 (1) in response to the test pulse when the test pulse is supplied from the controller 10 to the third safety component 2 (3), it is possible to recognize that a short circuit occurs between two systems included in the safety component 2 (2) (for example, the emergency stop switch) or between two systems in the first to third safety component 2 (1) to 2 (3).

FIG. 10 is a diagram for explaining an example in which the test pulse is supplied to the third safety component 2 (3) when the main switch 62 of the second safety component 2 (2) (for example, the emergency stop switch) is "OFF" to allow signals of the second safety signal wirings Lin (1) and Lin (2) to be "ON" momentarily with a time difference (t) to thereby detect a fault. In a case where an "ON" waveform appears in safety signals of two systems outputted from the first safety component 2 (1) in response to the test pulse when the test pulse is supplied from the controller 10 to the third safety component 2 (3), it is possible to recognize that a short circuit occurs between two systems included in the safety component 2 (2) (for example, the emergency stop switch) or between two systems in the first to third safety component 2 (1) to 2 (3).

As shown in FIG. 10, it is also possible to detect a fault by allowing any one of signals of the first safety signal wiring Lin (1) of the second safety signal wiring Lin (2) of the third safety component 2 (3) to be "ON" momentarily when the main switch 62 of the second safety component 2 (2) (for example, the emergency stop switch) is "OFF". If there is a short circuit between input lines in two systems relating to the safety signal or between main switches 62 (1) and 62 (2) in the second safety component 2 (2), an "ON" waveform synchronized with the test pulse appears in another signal. When the "ON" signal appears, it is possible to recognize that a short circuit occurs between the input lines or between the main switches 62 (1) and 62 (2) of the second safety component 2 (2) (for example, the emergency stop switch).

In the first embodiment, the modification example thereof and the second embodiment explained above, the connector members 4 included in respective serial cascade connector systems CCS have common configuration. However, it is also preferable that respective connector member 4 (1), connector member 4 (2), connector member 4 (3), arranged in order from the controller 10 side . . . may be dedicated as explained as a following third embodiment.

Figure 11:
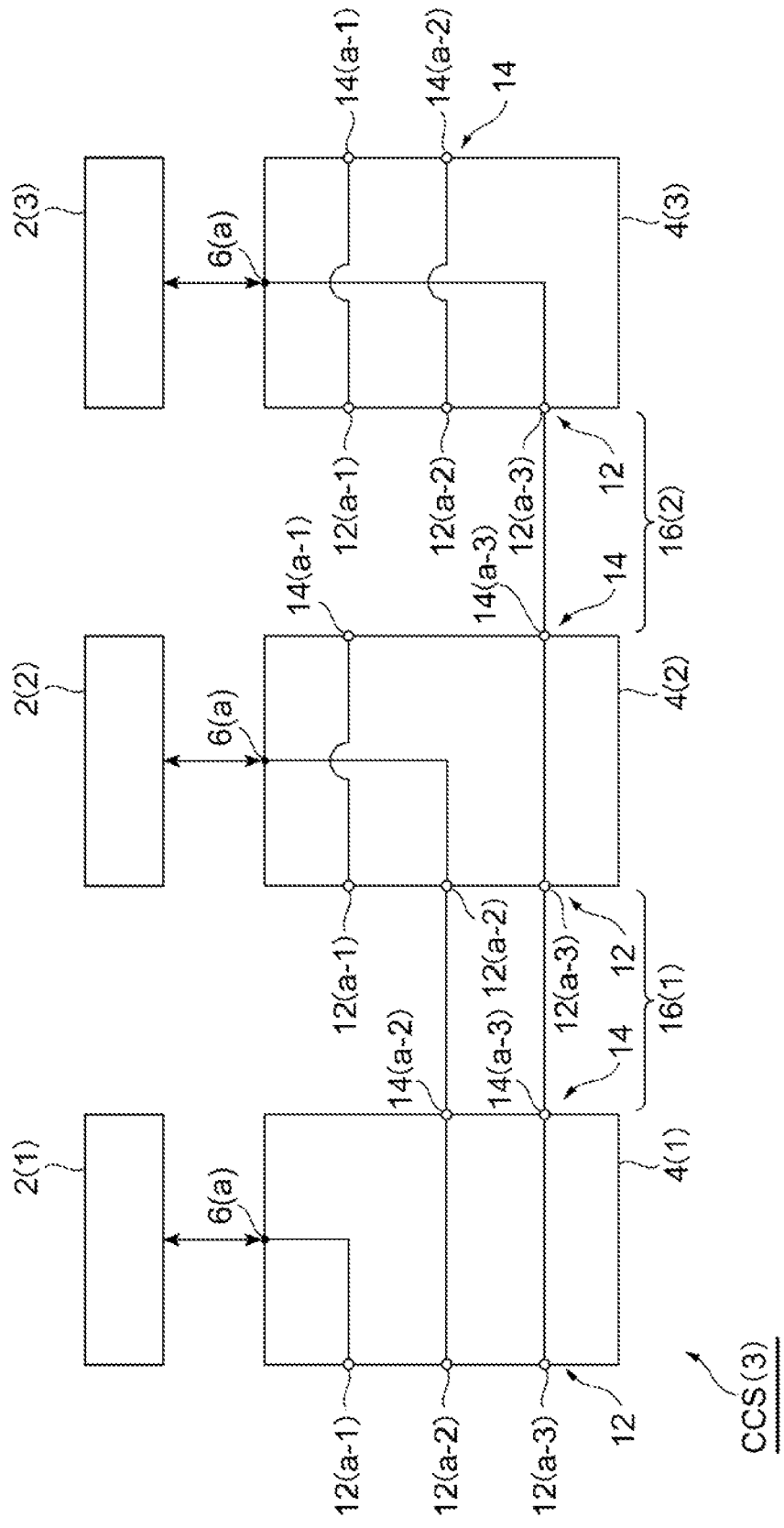
FIG. 11 is a diagram for explaining a serial cascade connector system according to a third embodiment in which respective connector members arranged in order from the controller side are configured by dedicated connector members.

FIG. 11 shows a serial cascade connector system CCS (3) according to the third embodiment, showing an example in which three additional safety components 2 (1) to 2 (3) are connected. In FIG. 11, wirings relating to giving/receiving of information are extracted and drawn.

Referring to FIG. 11, the downstream side terminal group 12 of the first connector member 4 (1) relating to the first safety component 2 (1) includes three terminals of downstream-side first information terminals 12 (a-1) to the third information terminal 12 (a-3). The upstream side terminal group 14 of the first connector member 4 (1) includes two terminals of upstream-side second information terminal 14 (a-2) and the upstream-side third information terminal 14 (a-3) without including the upstream-side first information terminal 14 (a-1).

In the first connector member 4 (1), the downstream-side first information terminal 12 (a-1) is connected to the component-side main information terminal 6 (a). The downstream-side second information terminals 12 (a-2) is connected to the upstream-side second information terminal 14 (a-2). The downstream-side third information terminal 12 (a-3) is connected to the upstream-side third information terminal 14 (a-3).

The downstream-side terminal group 12 of the second connector member 4 (2) relating to the second safety component 2 (2) includes three terminals of the downstream-side first information terminals 12 (a-1) to the third information terminal 12 (a-3). On the other hand, the upstream side terminal group 14 of the second connector member 4 (2) includes two terminals of upstream-side first information terminal 14 (a-1) and the upstream-side third information terminal 14 (a-3) without including the upstream-side second information terminal 14 (a-2).

In the second connector member 4 (2), the downstream-side first information terminal 12 (a-1) is connected to the upstream-side first information terminal 14 (a-1). The downstream-side second information terminals 12 (a-2) is connected to the component-side main information terminal 6 (a). The downstream-side third information terminal 12 (a-3) is connected to the upstream-side third information terminal 14 (a-3).

The downstream-side terminal group 12 of the third connector member 4 (3) relating to the third safety component 2 (3) includes three terminals of the downstream-side first information terminals 12 (a-1) to the third information terminal 12 (a-3). On the other hand, the upstream-side terminal group 14 of the third connector member 4 (3) includes two terminals of the upstream-side first information terminal 14 (a-1) and the upstream-side second information terminal 14 (a-2) without including the upstream-side third information terminal 14 (a-3).

In the third connector member 4 (3), the downstream-side first information terminal 12 (a-1) is connected to the upstream-side first information terminal 14 (a-1). The downstream-side second information terminals 12 (a-2) is connected to the upstream-side second information terminal 14 (a-2). The downstream-side third information terminal 12 (a-3) is connected to the component-side main information terminal 6 (a).

Concerning the connection cables 16 included in the serial cascade connector system CCS (3) according to the third embodiment, a first connection cable 16 (1) for connecting the second connector member 4 (2) to the first connector member 4 (1) is a dedicated item. The first connection cable 16 (1) includes two cable straight wirings 16a for connecting the upstream-side second information terminal 14 (a-2) and the upstream-side third information terminal 14 (a-3) of the first connector member 4 (1) to the downstream-side second information terminal 12 (a-2) and the downstream-side third information terminal 12 (a-3) of the second connector member 4 (2) respectively.

Also, a second connection cable 16 (2) for connecting the third connector member 4 (3) to the second connector member 4 (2) is a dedicated item. The second connection cable 16 (2) includes one cable straight wiring 16a for connecting the upstream-side third information terminal 14 (a-3) of the second connector member 4 (2) to the downstream-side third information terminal 12 (a-3) of the third connector member 4 (4).

When the serial cascade connector system CCS (3) according to the third embodiment is applied to connection of four safety components 2, it is preferable to design the system by adding additional information terminals to the downstream-side terminal groups 12 and the upstream-side terminal groups 14 of the connector members 4 respectively as well as one cable straight wiring is added to the connection cable 16 so as to correspond to the information terminals.

Also in the serial cascade connector system CCS (3) according to the third embodiment, it goes without saying that signals can be given and received between the controller and respective safety components 2 by using physical wiring included in the system.

What is claimed is:

1. A serial cascade connector system for connecting at least two safety components in series to provide a safety signal to a downstream-side by sequentially combining respective safety state detected by the at least two safety components, the serial cascade connector system comprising:

a first connector including:
a first component-side terminal group including a first information interface terminal through which a first information associated with a first safety component passes, the first component-side terminal group connected to the first safety component detecting a first safety state,
a first upstream-side terminal group, and
a first downstream-side terminal group including a first safety output terminal through which a first safety signal passes, the first signal generated on the basis of the first safety state detected by the first safety component; and a second connector including:
  a second component-side terminal group including a second information interface terminal through which a second information associated with a second safety component passes, the second component-side terminal group connected to the second safety component detecting a second safety state,
  a second upstream-side terminal group including a second safety input terminal through which the first safety signal passes, the second upstream-side terminal group connected to the first downstream-side terminal group, and
  a second downstream-side terminal group including a second safety output terminal through which a combined safety signal passes, the second safety signal generated on the basis of the first safety signal and the second safety state detected by the second safety component, a downstream-side main information terminal interconnected to the second information interface terminal in the second connector, providing the second information associated with the second safety component, and a first downstream-side other information terminal connected to the first information interface terminal internally through the second connector and the first connector.

2. The serial cascade connector system according to claim 1,
wherein the first component-side terminal group is formed of a connector member different from one of the safety component, and
the connector member includes a component-side main information terminal forming the component-side main information giving/receiving section.

3. The serial cascade connector system according to claim 2,
wherein each of the connector members includes an upstream-side terminal group used for connection to the upstream-side,
the upstream-side terminal group includes a single or plural upstream-side information terminals for individually giving and receiving information with respect to a single or plural safety components on the upstream side, and
each upstream-side information terminal can be connected to the component-side main information terminal of the connector member corresponding to each safety component on the upstream side.

4. A connector to be serially connected to one or more external connectors to form a serial cascade connector system for connecting at least two safety components in series to provide a safety signal to a downstream-side by sequentially combining respective safety state detected by the at least two safety components, a first external connector of the one or more external connectors including: a first component-side terminal group including a first information interface terminal through which a first information associated with a first safety component passes, the first component-side terminal group connected to the first safety component detecting a first safety state; a first upstream-side terminal group; and a first downstream-side terminal group including a first safety output terminal through which a first safety signal passes, the first signal generated on the basis of the first safety state detected by the first safety component; the connector comprising:
  a second component-side terminal group including a second information interface terminal through which a second information associated with a second safety component passes, the second component-side terminal group connected to the second safety component detecting a second safety state;
  a second upstream-side terminal group including a second safety input terminal through which the first safety signal passes, the second upstream-side terminal group connected to the first downstream-side terminal group; and
  a second downstream-side terminal group including
    a second safety output terminal through which a combined safety signal passes, the second safety signal generated on the basis of the first safety signal and the second safety state detected by the second safety component,
    a downstream-side main information terminal interconnected to the second information interface terminal in the second connector, providing the second information associated with the second safety component, and
    a first downstream-side other information terminal connected to the first information interface terminal internally through the external connector and the connector.

5. The connector according to claim 4,
wherein the second upstream-side information terminal group is connected to the first downstream-side terminal group of the external connector via a connection cable.

6. The connector according to claim 4,
wherein the downstream-side terminal group further includes at least one additional downstream-side other information terminal,
the upstream-side terminal group includes at least one additional upstream-side information terminal, and
the additional downstream-side other information terminal is connected to the additional upstream-side information terminal.

7. A safety component to be serially connected to one or more external connectors included in one or more external safety component respectively to form a serial cascade connector system for connecting at least two safety components in series to provide a safety signal to a downstream-side by sequentially combining respective safety state detected by the at least two safety components, a first external safety component of the one or more external safety components including: a first safety state detector configured to detect a first safety state, a signal generator configured to generate a first information associated with the first safety component and a first safety signal on the basis of the safety state detected by the first safety state detector; an upstream-side terminal group; and a first downstream-side terminal group including a first safety output terminal through which the first safety signal generated by the first signal generator; the safety component comprising:
  a second safety state detector configured to detect a second safety state;
  a second upstream-side terminal group including a second safety input terminal through which the first safety signal passes, the second upstream-side terminal group connected to the first downstream-side terminal group;
  a second signal generator configured to generate a second safety signal on the basis of the first safety signal and the second safety state detected by the second safety state detector; and
  a second downstream-side terminal group including a second safety output terminal through which a combined safety signal passes, the second safety signal generated by the second signal generator, a downstream-side main information terminal providing the second information associated with the safety component, and a first downstream-side other information terminal connected to the first information interface terminal internally through the first external safety component and the safety component.

8. The safety component according to claim 7, wherein the second upstream-side information terminal group is connected to the first downstream-side terminal group of the external connector via a connection cable.

9. The safety component according to claim 7, wherein the downstream-side terminal group further includes at least one additional downstream-side other information terminal, the upstream-side terminal group includes at least one additional upstream-side information terminal, and the additional downstream-side other information terminal is connected to the additional upstream-side information terminal.

10. The serial cascade connector system according to claim 1, wherein the second upstream-side information terminal group is connected to the first downstream-side terminal group of the first connector via a connection cable.

11. The serial cascade connector system according to claim 10, wherein the first downstream-side terminal group further includes a first downstream-side main information terminal interconnected to the first information interface terminal in the first connector, providing the first information associated with the first safety component, the second upstream-side terminal group further includes an upstream-side information terminal interconnected to the first downstream-side other information terminal in the second connector, and the upstream-side information terminal is connected to the first downstream-side main information terminal by a straight wiring via the connection cable.

12. The serial cascade connector system according to claim 10, wherein the first downstream-side terminal group further includes a first downstream-side main information terminal interconnected to the first information interface terminal in the first connector, providing the first information associated with the first safety component, the second upstream-side terminal group further includes an upstream-side information terminal interconnected to the first downstream-side other information terminal in the second connector, and the upstream-side information terminal is connected to the first downstream-side main information terminal by a shift wiring via the connection cable.

13. The serial cascade connector system according to claim 1, wherein the downstream-side terminal group further includes at least one additional downstream-side other information terminal, the upstream-side terminal group includes at least one additional upstream-side information terminal, and the additional downstream-side other information terminal is connected to the additional upstream-side information terminal.

14. The connector according to claim 5, wherein the first downstream-side terminal group further includes a first downstream-side main information terminal interconnected to the first information interface terminal in the external connector, providing the first information associated with the first safety component, the second upstream-side terminal group further includes an upstream-side information terminal interconnected to the first downstream-side other information terminal, and the upstream-side information terminal is connectable to the first downstream-side main information terminal by a straight wiring via the connection cable.

15. The connector according to claim 5, wherein the first downstream-side terminal group further includes a first downstream-side main information terminal interconnected to the first information interface terminal in the external connector, providing the first information associated with the first safety component, the second upstream-side terminal group further includes an upstream-side information terminal interconnected to the first downstream-side other information terminal, and the upstream-side information terminal is connectable to the first downstream-side main information terminal by a shift wiring via the connection cable.

16. The safety component according to claim 8, wherein the first downstream-side terminal group further includes a first downstream-side main information terminal providing the first information associated with the first safety component, the second upstream-side terminal group further includes an upstream-side information terminal interconnected to the first downstream-side other information terminal, and the upstream-side information terminal is connectable to the first downstream-side main information terminal by a straight wiring via the connection cable.

17. The safety component according to claim 8, wherein the first downstream-side terminal group further includes a first downstream-side main information terminal providing the first information associated with the first safety component, the second upstream-side terminal group further includes an upstream-side information terminal interconnected to the first downstream-side other information terminal, and the upstream-side information terminal is connectable to the first downstream-side main information terminal by a shift wiring via the connection cable.

* * * * *